(12) United States Patent
Duan et al.

(10) Patent No.: US 10,661,469 B2
(45) Date of Patent: May 26, 2020

(54) WOODWORKING LATHE CONTROL SYSTEM

(71) Applicant: Rikon Power Tools, Inc., Billerica, MA (US)

(72) Inventors: Wuzheng Duan, Qingdao Shandong (CN); Libin Sun, Qingdao Shandong (CN); Liting Zhao, Qingdao Shandong (CN); Min Zhang, Qingdao Shandong (CN)

(73) Assignee: Rikon Power Tools, Inc., Billerica, MA (US)

( * ) Notice: Subject to any disclaimer, the term of this patent is extended or adjusted under 35 U.S.C. 154(b) by 237 days.

(21) Appl. No.: 15/583,216

(22) Filed: May 1, 2017

(65) Prior Publication Data

US 2017/0341260 A1 Nov. 30, 2017

(30) Foreign Application Priority Data

May 30, 2016 (CN) .......................... 2016 1 0370326

(51) Int. Cl.
*B27C 7/02* (2006.01)
*B23C 5/16* (2006.01)
*H02P 6/30* (2016.01)
*H02P 29/032* (2016.01)
*H02P 7/03* (2016.01)
*H02P 29/024* (2016.01)
*B23Q 5/16* (2006.01)

(52) U.S. Cl.
CPC .................. *B27C 7/02* (2013.01); *B23Q 5/16* (2013.01); *H02P 6/30* (2016.02); *H02P 7/05* (2016.02); *H02P 29/027* (2013.01); *H02P 29/0241* (2016.02); *H02P 29/032* (2016.02)

(58) Field of Classification Search
CPC ..... B23B 3/00; H02P 6/30; H02P 7/05; H02P 29/0241; H02P 29/032; H02P 29/027; B23Q 5/16; B23Q 5/167; B23Q 5/147; G05B 19/39; B27C 7/02
See application file for complete search history.

(56) References Cited

U.S. PATENT DOCUMENTS

| | | | | |
|---|---|---|---|---|
| 1,946,839 A | * | 2/1934 | Cole | B23Q 5/28 82/117 |
| 2,203,297 A | * | 6/1940 | Granberg | H01H 3/26 200/4 |
| 2,351,649 A | * | 6/1944 | Wintermute | B23Q 15/00 82/118 |
| 2,489,203 A | * | 11/1949 | Siekmann | B23Q 5/147 82/132 |
| 2,600,988 A | * | 6/1952 | Greene | B23Q 5/16 318/12 |
| 2,716,368 A | * | 8/1955 | Thompson, Jr. | B23Q 15/12 82/152 |
| 2,737,620 A | * | 3/1956 | Greene | H02P 7/03 318/258 |
| 2,946,249 A | * | 7/1960 | Swanson | B23B 5/00 82/11 |

(Continued)

*Primary Examiner* — Sara Addisu
(74) *Attorney, Agent, or Firm* — Wolf, Greenfield & Sacks, P.C.

(57) ABSTRACT

Lathe control systems and methods are described including stopping a motor prior to reversing direction as well as methods and systems that implement voltage and/or current protection thresholds.

11 Claims, 6 Drawing Sheets

(56) References Cited

U.S. PATENT DOCUMENTS

| | | | | |
|---|---|---|---|---|
| 3,197,687 | A | * | 7/1965 | Vaucher .................... H02P 3/12 |
| | | | | 318/270 |
| 3,215,011 | A | * | 11/1965 | Findeis ................ G05B 19/421 |
| | | | | 82/11.1 |
| 4,469,993 | A | * | 9/1984 | Swanson ................ G05B 19/39 |
| | | | | 198/810.01 |
| 4,558,265 | A | * | 12/1985 | Hayashida ........... G05B 19/416 |
| | | | | 318/561 |
| 4,618,808 | A | * | 10/1986 | Ish-Shalom ............. H02P 25/08 |
| | | | | 318/685 |
| 4,831,315 | A | * | 5/1989 | Hammond ............. G05B 19/39 |
| | | | | 318/567 |
| 6,046,523 | A | * | 4/2000 | Bailey ................... H02K 1/2733 |
| | | | | 310/112 |

\* cited by examiner

WOODWORKING LATHE CONTROL SYSTEM

CROSS-REFERENCE TO RELATED APPLICATIONS

This application claims the benefit of priority under 35 U.S.C. § 119(a) of Chinese Patent Application No. 201610370326.2, filed May 30, 2016 the disclosure of which is incorporated herein by reference in its entirety.

FIELD

Disclosed embodiments are related to lathe control systems.

BACKGROUND

Conventional woodworking lathes may a main shaft driven by a transmission including a belt which is in turn driven by an associated motor. The motor is typically a direct-current motor, an alternating current asynchronous motor, and/or a servo motor. During operation of a woodworking lathe, the motor drives the transmission belt to rotate the main shaft of the lathe. The main shaft then drives a center or a chuck to rotate a part, such as a workpiece, to be processed and is held therein. While the part is being rotated, a cutting tool cuts the workpiece.

SUMMARY

In one embodiment, a lathe includes an electrical motor drivingly coupled to a shaft of the lathe. The lathe also includes a controller that controls a power applied to the electrical motor during operation. When an operating direction of the electrical motor is reversed from a first direction to a second direction, the controller powers off the electrical motor until the electrical motor stops rotating and then the controller applies power to the electrical motor to drive the electrical motor in the second direction.

In another embodiment, a method includes: detecting a signal to reverse an operating direction of an electrical motor drivingly coupled to a shaft of the lathe from a first direction to a second direction; powering off the electrical motor until the electrical motor stops rotating; and applying power to the electrical motor to drive the electrical motor in the second direction.

In yet another embodiment, a lathe includes an electrical motor drivingly coupled to a shaft of the lathe. The lathe also includes a controller that controls operation of the motor. Additionally, the lathe includes at least one detector that outputs a signal to the controller. The at least one detector detects an electrical characteristic of at least one of an electrical bus and the electrical motor. The controller then controls at least one aspect of the electrical motor's operation based on a comparison of the detected electrical characteristic to a preset threshold.

In another embodiment, a method includes detecting an electrical characteristic of at least one of an electrical bus and an electrical motor of a lathe; and controlling at least one aspect of the electrical motor's operation based on a comparison of the detected electrical characteristic to a preset threshold.

In yet another embodiment, a woodworking lathe control system may include a microcontroller, a forward and reverse rotation input detection circuit, a motor, and an insulated-gate bipolar transistor (IGBT) drive circuit. The forward and reverse rotation input detection circuit is connected to the microcontroller. The control system also includes a bus voltage sampling module, a motor voltage sampling module, and a current sampling module that are configured to detect a bus voltage, a motor voltage, and a motor current, respectively, and transmit the detected values to the microcontroller. The microcontroller then controls a motor motion using the IGBT drive circuit. The control system may also include a voltage-protection-point setting module and/or a current-protection-point setting module where the voltage protection point may include a at least one of a bus over-voltage protection point, a bus under-voltage protection point, and a motor voltage protection point, and the current protection point may include at least one of a hardware protection point, a software protection point, and a locked-rotor protection point. The woodworking lathe control system may also implement a stepless speed-regulation module and torque-regulation module with the microcontroller.

In the above noted embodiment, a forward and reverse rotation input detection circuit may include an input interface, and a first capacitor C1 and a second resistor R2 that are connected in series to the input interface to form a loop. A connecting terminal of the first capacitor C1 and the second resistor R2 are connected to a power supply using a first resistor R1, and the connecting terminal may be an I/O terminal, and the other terminal of the first capacitor C1 may be grounded.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
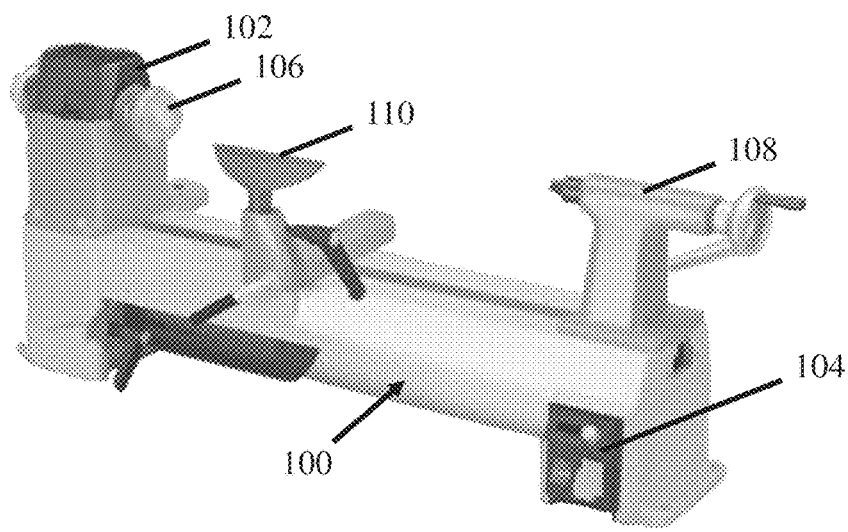
FIGS. 1A-1G are schematic views of a lathe.
Figure 1B:
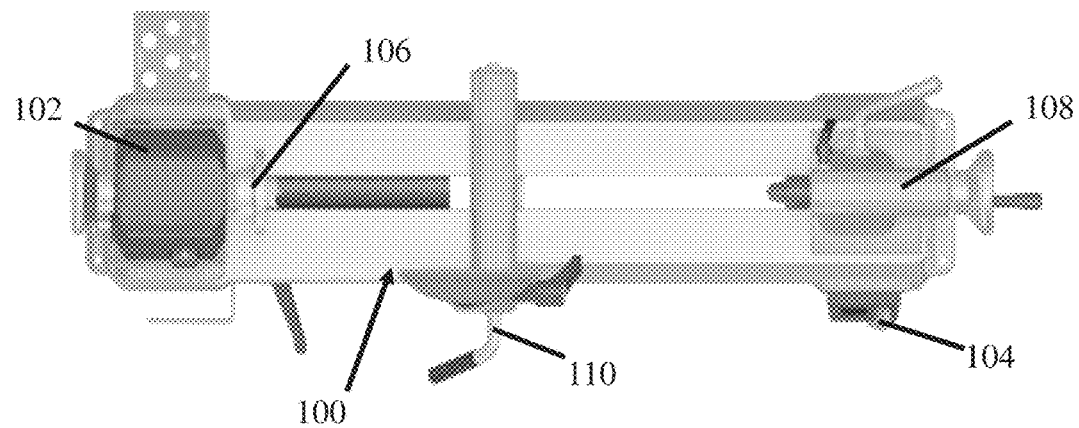
Figure 1C:
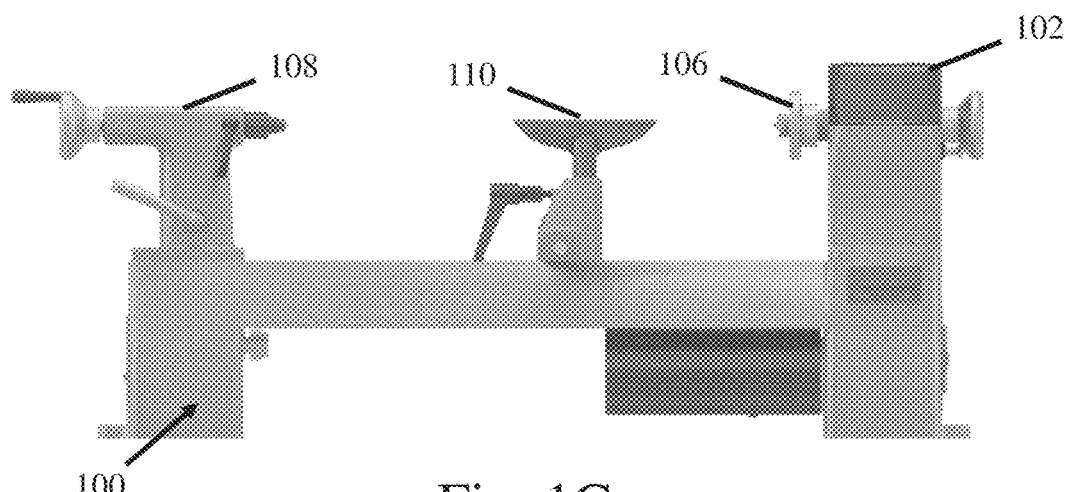
Figure 1D:
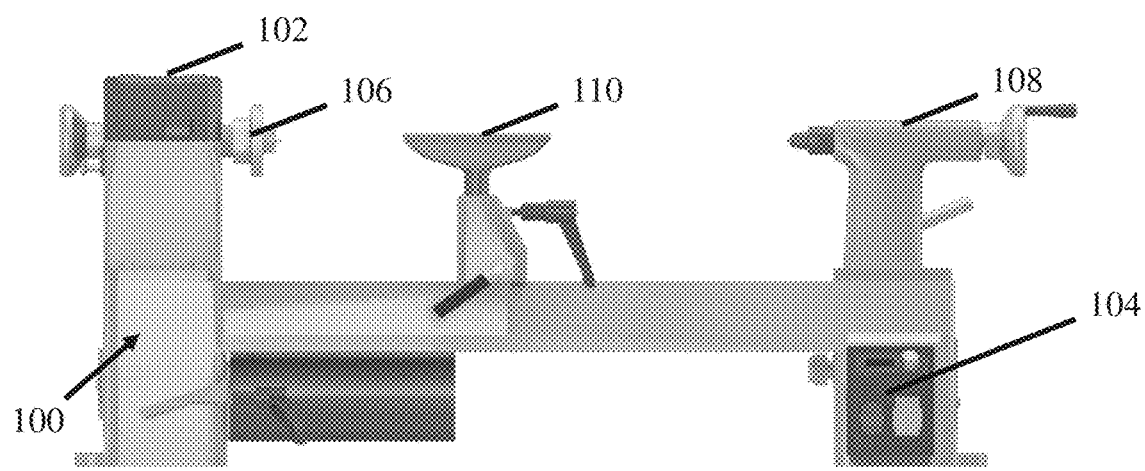
Figure 1E:
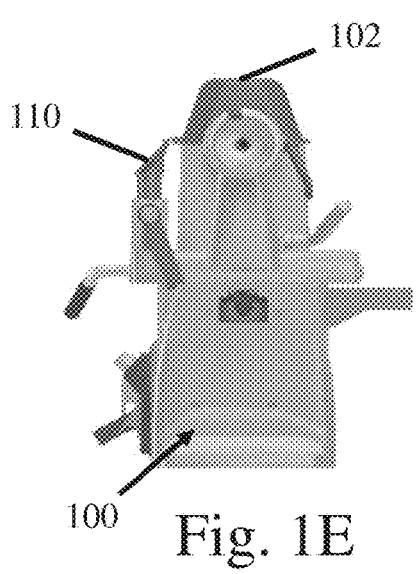
Figure 1F:
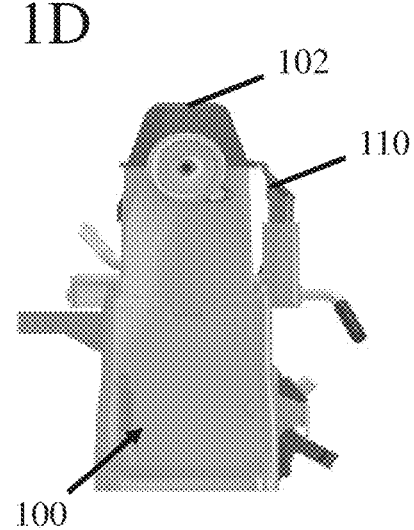
Figure 1G:
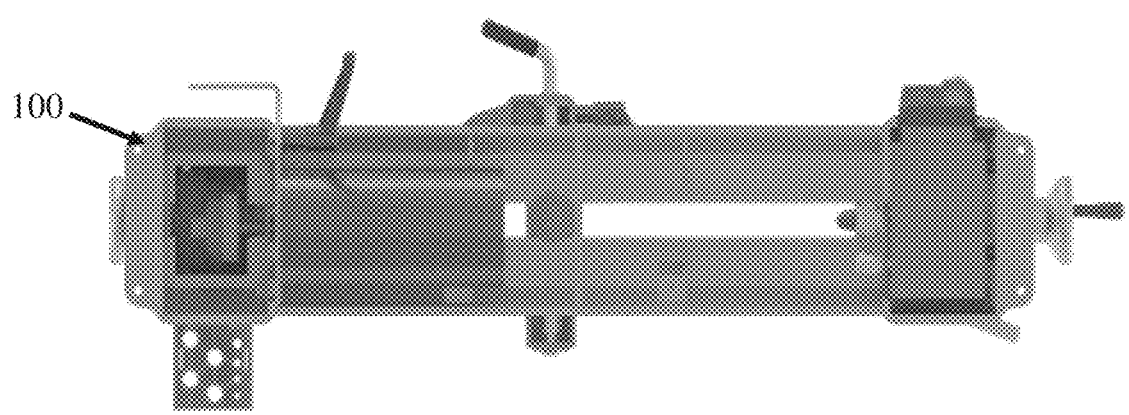

At present, most commercially available woodworking lathes use an alternating current asynchronous motor and can only operate at fixed speeds using 3 gears to 6 gears. However, these systems cannot implement a stepless speed-regulation function, and do not have a forward and reverse rotation function. Additionally, the Inventors have recognized that while these woodworking lathes operate at a constant rotational speed, the associated torque may drop rapidly during a cutting process, which may have an adverse effect on the cutting process. While a frequency converter and a controller might be used to address this, such a solution is bulky and costly, and thus is inappropriate for use in a woodworking lathe. Additionally, while some smaller woodworking lathes may implement speed regulation of a motor, they do not switch a rotation direction of the lathe and they have simplistic current or voltage protection thresholds and systems that are inadequate for the ways in which these systems are actually used.

In view of the above, the Inventors have recognized that it may be desirable to provide a lathe control system that enables safer, more effective, and/or more convenient operation of a lathe. For example, in order to facilitate cutting workpieces with different shapes and sizes, provide increased power for cutting operations, safety, convenient operation, and/or a desired finish quality for a processed surface, it may be desirable for a lathe to maintain large and/or constant output torques during operation, permit forward and reverse rotation of the electrical motor and associated shaft, and/or provide different rotational speeds of the main shaft during processing work using stepless speed-regulation. The Inventors have also recognized the benefits associated with a lathe that may operate in forward and reverse directions while preventing possible misoperation by an operator which may damage a drive system or a motor of the lathe. Additionally, the Inventors have recognized the benefits associated with embodiments where a lathe includes over-voltage protection, over-current protection, under-voltage, and/or under-current protection. Such an embodiment may be beneficial in a woodworking lathe because, for example, woodworking hobbyists perform lathe cutting operations using manually operated cutting tools which may oftentimes lead to overload phenomena that may burn out the associated motor and/or control system.

In one embodiment, controller is configured to control a forward and reverse rotation function of a lathe motor to facilitate cutting workpieces that have different shapes and sizes. In such an embodiment, the controller may be configured to detect a desired operating direction input and may then implement a misoperation protection control protocol when switching between forward and reverse rotation of the motor to protect the lathe from damage. For example, during a cutting process, the direction change input from forward to reverse rotation of the motor may be triggered at any moment. However, when the input is detected, the controller may stop the lathe motor automatically, instead of immediately applying power to operate the lathe motor in the opposite direction. This may improve operational safety and/or prevent misoperation of the lathe by a user to protect both an operator and the lathe while also extending a service life of the lathe.

In one such embodiment of a lathe, an electrical motor of the lathe may be drivingly coupled to a rotatable shaft of the lathe. This rotatable shaft may be selectively couplable to a workpiece using a chuck, center, and/or any other appropriate device in order to hold the workpiece during a cutting operation. The lathe may also include a controller that controls the power applied to the electrical motor during operation. Specifically, the controller may apply a power to the electrical motor to drive the electrical motor and associated shaft in a first desired direction. However, when a signal to reverse an operating direction of the lathe is received from any appropriate input device, the controller may power off the electrical motor until it stops rotating. The controller may then apply power to the electrical motor to drive the electrical motor and the associated shaft in the opposite second direction. Thus, the controller may prevent the motor being driven in the opposite direction while it is still rotating which may help prevent burnout of the motor.

In some embodiments, a lathe controller may not only control the lathe, but may also be configured to implement one or more voltage protection points and/or current protection points so as to implement comprehensive current and/or voltage protection for the motor and/or controller itself. For example, the controller may be in electrical communication with a motor voltage sampling module, a bus voltage sampling module, and/or a current sampling module. These modules may be configured to detect a motor voltage, a bus voltage, and/or a motor current, respectively. The controller may then compare these detected signals to one or more preset protection points, after which the controller may control more aspects of a lathe's operation based on this comparison. Accordingly, the controller may implement a comprehensive protection scheme for both the motor and overall system to provide the desired power for the lathe's operation while avoiding damage to the lathe's drive and/or control systems due to issues such as overload of the woodworking lathe.

In one such embodiment, a lathe may include an electrical motor that is drivingly coupled to a shaft of the lathe. Similar to the above, the rotatable shaft may be selectively couplable to a working piece in an appropriate manner. The lathe may also include a controller that controls the power applied to the electrical motor during operation. At least one detector may output a signal to the controller. For example, the at least one detector may detect an electrical characteristic of at least one of an electrical bus and the electrical motor of the lathe. Further, the controller may compare the detected electrical characteristic to a preset threshold. Based on this comparison, the controller may control at least one aspect of the electrical motor's operation. Possible electrical characteristics that may be used include, but are not limited to, a bus voltage, a motor voltage, a motor current, and/or any other appropriate electrical characteristic associated with the lathe's operation. As described further below, the associated preset thresholds may correspond to various types of protection points including, but not limited to, a bus over-voltage protection point, a bus under-voltage protection point, a motor voltage protection point, a current protection point (e.g. a hardware protection point, a software protection point, and a locked-rotor protection point) to name a few.

As noted above, in some embodiments, it may be desirable to implement stepless speed control for a lathe. In one such embodiment, a lathe may include a potentiometer, or other appropriate voltage detector and a current detector. A controller may then control both a speed of the motor and a current applied to the motor. In one embodiment, this may be implemented using a stepless speed-regulation module and a torque-regulation module that control the applied voltage to control the motor speed, and a current applied to the motor. This may thus enable the operation of a lathe in low speed, large torque applications. To facilitate such a type of operation, the controller may be configured to control the voltage and current applied to the lathe's motor using pulse width modulation where it is possible to alter a pulse width of a drive signal to alter an effective voltage applied to the motor as well as the applied motor current. Such a control system and method may enable stepless speed regulation of the motor, so that a rotational speed of the motor may be smoothly and continuously changed while permitting the motor to operate stably at any point within an entire operational range of the motor's rotational speed and torque range. This may also enable safe and stable operation of the lathe while also improving cutting efficiency and precision.

In one embodiment implementing stepless speed control, a controller may include a speed-regulation module and a torque-regulation module. Because a torque and a current of a direct-current motor are directly proportional to one another, a controller may performing current sampling, feedback, and compensation for a current applied to the motor. Using such an arrangement the stepless speed-regulation and torque-regulation modules may control the motor current in real time, so as to implement control of torque regulation. Further, in some embodiments, a potentiometer, or other voltage detection module, may be connected to the controller. Thus, the controller may detect a voltage of the motor using the potentiometer, so as to regulate a motor drive signal (a pulse width of a PWM signal) to regulate the motor voltage, thereby implementing stepless speed regulation of the motor, and making it convenient for a user to cut different materials.

In view of the above, in one embodiment, a woodworking lathe control system may include a controller, a forward and reverse rotation input detection circuit, a motor, and an insulated-gate bipolar transistor (IGBT) drive circuit. The forward and reverse rotation input detection circuit may be connected to the controller. The lathe control may further comprise a bus voltage sampling module, a motor voltage sampling module, and a current sampling module, that are configured to detect a bus voltage, a motor voltage, and a motor current, respectively. These modules may include one or more associated detectors that transmit the detected values or signals to the controller. The controller may then control the motor's motion using an insulated-gate bipolar transistor (IGBT) drive circuit.

In the above embodiment, the electrical leads or ends of the motor may be connected with freewheeling diodes. Additionally, the current sampling module may use a current sampling resistor as a current detector to perform current sampling. The controller may also include a voltage-protection-point setting module where the voltage protection point may include a bus over-voltage protection point, a bus under-voltage protection point, and a motor voltage protection point, and one or more detectors that detect the motor voltage and/or the bus voltage of the system to provide enhanced voltage protection for the motor and control system. The controller may also include a current-protection-point setting module, where the current protection point may correspond to one or more of a hardware protection point, a software protection point, and a locked-rotor protection point. Using the motor characteristics, the different protection points may be selected to provide more comprehensive protection for the motor to help ensure normal and safe operation of a lathe.

In embodiments incorporating a reverse rotation functionality, a forward and reverse rotation input detection circuit may include an interface (e.g. a switch, keypad, keyboard, touchscreen, or any other appropriate input device), as well as a first capacitor C1 and a second resistor R2 that are connected in series to the key interface relative to one another such that they form a loop. Further, a connecting terminal of the first capacitor C1 and the second resistor R2 may be connected to a high voltage bus or connector through a first resistor R1. The connecting terminal may be an I/O terminal, and the other terminal associated with the first capacitor C1 may be grounded. Further, the current sampling module may be subject to current filtering. The current sampling module, or other appropriate current detector, may be connected to the controller in any appropriate manner to output a detected signal to the controller. For example, a current sampling module may be connected to a controller through a voltage comparator and an operational amplifier to facilitate data processing.

Turning to the figures, several nonlimiting embodiments are described in further detail. However, it should be understood that the various components, features, and methods described in relation to these embodiments may be combined in any appropriate fashion as the disclosure is not limited to any particular embodiment. Additionally, while the embodiments described herein are primarily directed to a woodworking lathe, in some embodiments, the described control systems and methods may be used with any lathe system or other power wood working tools as the disclosure is not so limited.

FIGS. 1A-1G depicts one embodiment of a lathe. In the depicted embodiment, the lathe includes a carriage body 100 to which the other components of the lathe are attached. A headstock, or motor housing, 102 is disposed on one end of the carriage body. The headstock may contain an electrical motor that is drivingly coupled to a rotatable shaft of the lathe, not depicted. The rotatable shaft may be coupled to the electrical motor using any appropriate type of transmission. The rotatable shaft is connected to a spindle or chuck 106 that is used to selectively hold a workpiece in the lathe. A corresponding tailstock assembly 108 including a center may be disposed on an opposing end of the carriage body to help support an opposing end of a work piece connected to the rotatable shaft. In some embodiments, the tailstock may be slidable towards and away from the headstock and corresponding chuckle or spindle. Additionally, a tool support 110 may be selectively moved and locked in place along a length of the carriage body to facilitate a user working on a workpiece supported by the chuck or spindle and tailstock assembly An interface 104 may also be included in a lathe. The interface may include a display connected to a controller of the lathe to display information to a user and/or may include one or more input devices for controlling operation of the lathe. Appropriate displays include, but are not limited to, liquid crystal displays, nixie tube displays, LED displays, a screen display, and/or any other appropriate type of display as the disclosure is not so. The display may be used to display any information to an operator in any appropriate fashion including, for example, numerical codes, color codes, text, graphical images, or any other appropriate way of displaying information to an operator. Additionally, appropriate input devices may correspond to any way of inputting desired operational information to a controller of the lathe. As discussed in more detail below, appropriate inputs include dials, switches, rotatable handles, a keypad, a keyboard, a touchscreen, and/or any other appropriate type of input as the disclosure is not so limited.

Figure 2:
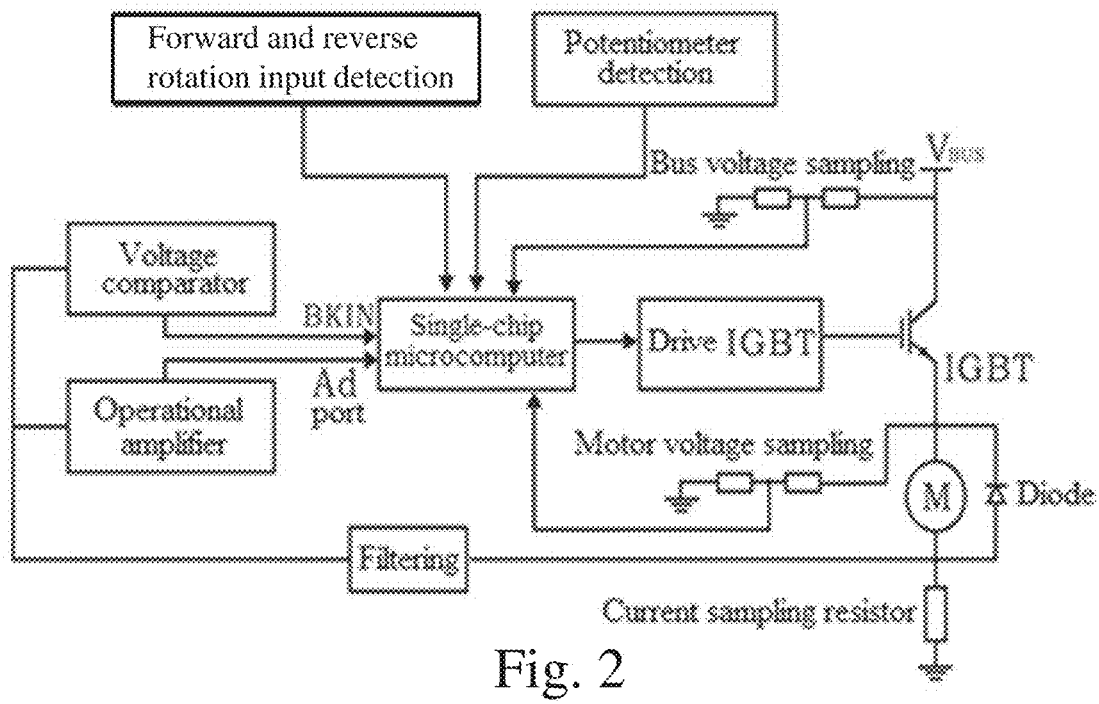
FIG. 2 is a schematic structural view of a control system according to one embodiment.

FIG. 2 is a schematic structural view of one embodiment of a woodworking lathe control system. The woodworking lathe control system may include a controller, a forward and reverse rotation input detection circuit, a motor, and an insulated-gate bipolar transistor (IGBT) drive circuit. Two ends of the motor may be connected with freewheeling diodes. The forward and reverse rotation input detection circuit may be connected to the controller such that it outputs a directional control signal to the control regarding whether or not to operate the lathe in a forward or reverse direction. The woodworking lathe control system may further include a bus voltage sampling module, a motor voltage sampling module, and a current sampling module. These various modules may include appropriate voltage and/or current detectors configured and arranged to detect a bus voltage, a motor voltage, and/or a motor current respectively. The modules and/or individual detectors may then transmit signals corresponding to the detected values to the controller. The controller may then control the motor's motion using the IGBT drive circuit. As noted previously above, to facilitate operation of the lathe by an operator, the controller may also be connected with an appropriate display, such as a nixie tube display (not shown), which may provide a prompt to the operator using a digit display. Additionally, while any appropriate type of controller may be used as detailed further below, in one embodiment, an STM8S series single-chip microcomputer may be used for the controller.

Figure 3:
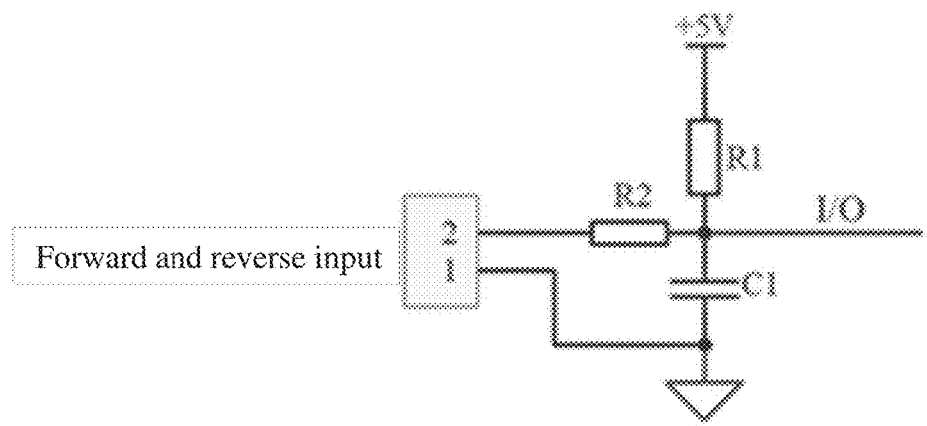
FIG. 3 is a schematic structural view of one embodiment of the forward and reverse rotation input detection circuit of FIG. 1.

Referring to FIG. 3, one embodiment of a forward and reverse rotation input detection circuit is described. In the depicted embodiment, the forward and reverse rotation input detection circuit includes an input interface that is switchable between first and second states corresponding to the forward and reverse direction (e.g. a switch). The depicted circuit also includes a first capacitor C1 and a second resistor R2 that are connected in series to the input (a directional switch) to form a loop. The connecting terminal of the first capacitor C1 and the second resistor R2 may be connected to a power supply through a first resistor R1. The connecting terminal may also be an I/O terminal, and the other terminal of the first capacitor C1 may be grounded. Thus, the depicted embodiment of a forward and reverse rotation input detection circuit is designed so that operation is simple, use is convenient, and the safety performance of the control system is improved.

Figure 4:
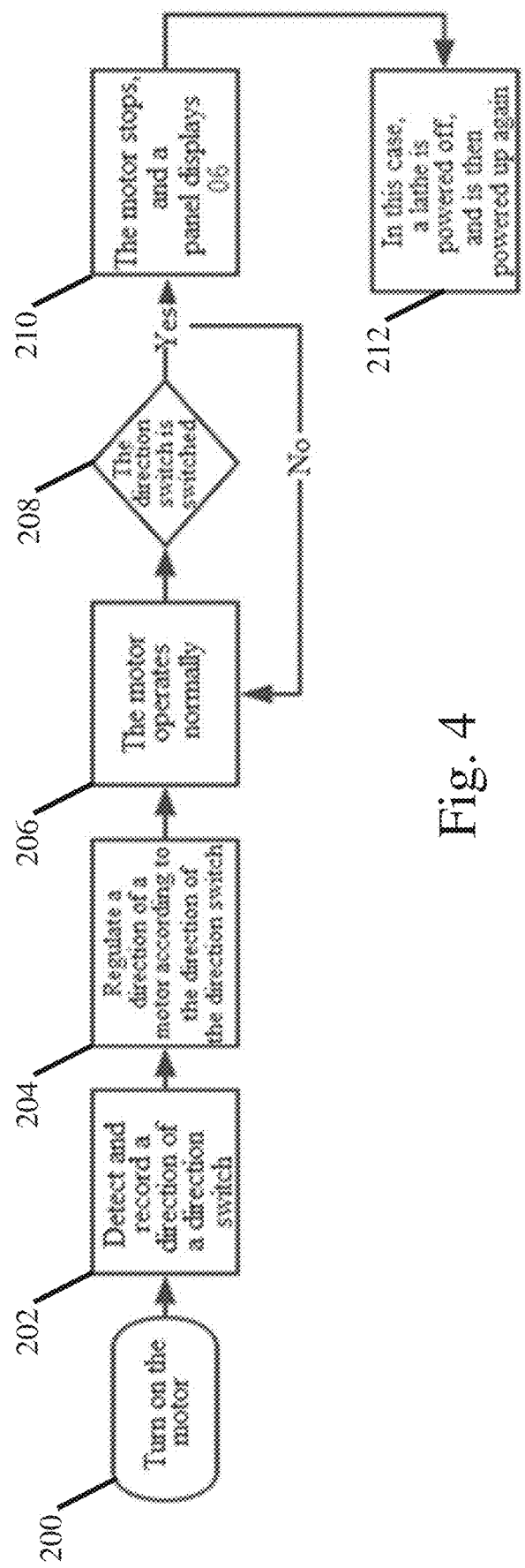
FIG. 4 is a block diagram of a method of control for performing direction switching of a motor according to one embodiment.

FIG. 4 depicts one embodiment of a control method for a lathe undergoing forward and reverse rotation switching of a motor of the lathe. In this embodiment, a forward and reverse rotation direction switching function of the motor may be implemented in the following two ways. First, if an operator desires to change a direction of operation of the motor, the motor may be stopped first, a selected operation direction of the motor may then be switched, and the motor may be restarted to switch an operating direction of the motor. In addition to this possibility, a controller may implement the following when changing a direction of a lathe motor while the motor is being operated. First at 200 the lathe motor may be initially turned on and rotated in a first direction after detecting a selected operation direction from a forward and reverse rotation input which is used to control the direction and operation of the motor in the selected operation direction at 202 and 204. The motor may then be operated under normal operating conditions at 206. While the lathe motor is being operated, an associated controller may continually monitor a signal received from the forward and reverse rotation input to determine if the desired operation direction of the motor has been switched from the first desired operation direction to a second opposite direction while the motor is being operated at 208. In this case, the controller may detect the input to change direction and control the motor to turn off a power to the motor to stop the motor automatically. In some instances a controller may also apply a brake to the motor and/or an associated shaft to further facilitate stopping the motor. The controller may then command an associated display, such as a nixie tube, LED, LCD, or other display to display an indicator, such as the number code "06", to provide a prompt to the operator that the motor operation direction has been switched at 210. After stopping the motor, the controller may then turn a power supply connected to the motor on again to supply power to the motor and operate the motor in the opposite switched direction at 212. Motor operation may then continue normally until additional inputs to switch direction are received by the controller.

In view of the above, in some embodiments, during rotation of a motor, if a worker were to operate the motor to switch direction without first stopping the motor, a single-chip microcomputer may further detect a the directional input state, and control an IGBT drive circuit (the IGBT is an insulated-gate bipolar transistor, is a composite full-control voltage-driven power semiconductor device formed of a bipolar junction transistor (BJT) and a metal-oxide-semiconductor (MOS) (insulated-gate field effect transistor), and has a low driving power and a low saturated voltage drop) to turn off an IGBT, to make the motor stop, thereby providing enhanced system and operator safety.

In addition to the above, in some embodiments, it may be desirable to provide comprehensive voltage and/or current protection for a control system and/or motor of a lathe. For example, the controller may include a voltage-protection-point setting module and/or a current-protection-point setting module. A voltage protection point may include at least one of a bus over-voltage protection point, a bus under-voltage protection point, and a motor voltage protection point. Depending on the particular embodiment, the monitored bus voltage may correspond to a bus that is electrically connected to one or both of the controller and motor. Additionally, a current protection point may include one or more of a hardware protection point, a software protection point, and a locked-rotor protection point. The different protection points may be designed according to the motor and/or controller characteristics so that the provided current and/or voltage protection is more comprehensive than in a typical woodworking lathe. This may therefore ensure normal and safe operation of the device while also providing enhanced operational safety. Several specific embodiments of these voltage and current protection points are described further below in regards to FIGS. 5 and 6.

Figure 5:
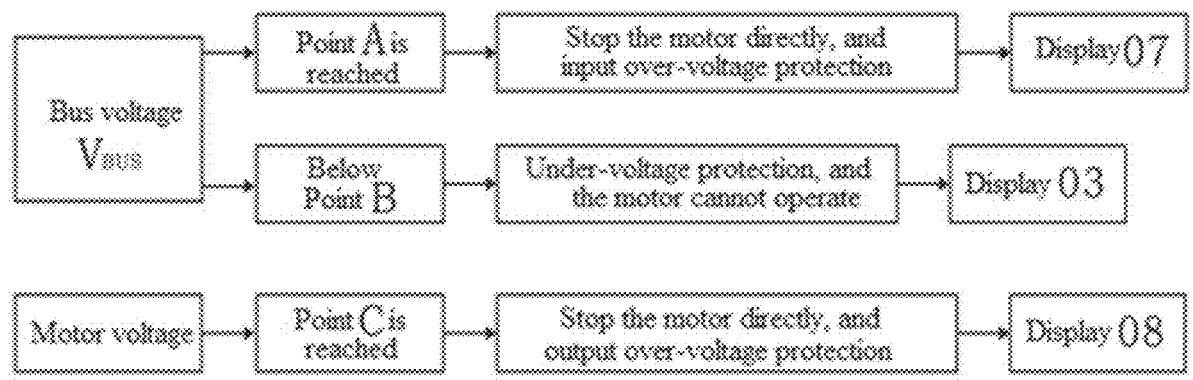
FIG. 5 is a block diagram of a voltage protection method according to one embodiment.

One embodiment of a bus voltage and motor voltage protection method is described in reference to FIG. 5. During operation of the motor, a motor voltage sampling module and bus voltage sampling module are configured to detect the motor voltage and the bus voltage, respectively. The detected voltages may be detected in real time and the detected voltage values may be transmitted to the controller. The controller may then compare these detected voltage values to one or more preset threshold values. For example, the detected bus voltage may be compared to a bus under-voltage protection point B and/or a bus over-voltage protection point A. Similarly, the controller may compare the detected motor voltage to a motor voltage protection point C of the voltage-protection-point setting module. The bus under-voltage protection point and the bus over-voltage protection point may be set according to an electrical power requirements of the lathe motor as well as the voltage requirements of the associated controller. Correspondingly, the bus over-voltage protection point or threshold may be selected to protect the controller itself to prevent excessive voltage being applied to the controller. For example, if an excessively high voltage is applied to the controller, but there is no protection measure in place, the controller may be damaged. Similarly, the motor voltage protection point C may be set to correspond to a rated maximum operating voltage of the motor. Thus, operation of the motor above this voltage for extended durations, which may damage the motor, and/or result in excessively high rotational speeds, may be prevented. Therefore, the provided protection points may also act as overspeed protections as well.

When a detected bus voltage reaches an upper threshold such as bus over-voltage protection point A, a lathe motor may be stopped. Specifically, in one embodiment, a controller associated with the lathe motor may control implementation of an over-voltage protection method by turning off power from a power supply to the motor. The controller may then command a display, such as a nixie tube to display, to output a state code such as "07". Similarly, when it is detected that the bus voltage is below the voltage threshold illustrated by protection point B, the controller may again implement a voltage protection method. While this may be done in any appropriate manner, in one embodiment, the motor is controlled to stop operation by, for example, turning off power to the motor, and a the display may output an indication of the condition in any appropriate way including outputting a state code such as "03". As also shown in FIG. 5, the motor voltage may be monitored such that when it is detected that the motor voltage reaches an upper threshold such as the depicted motor protection point C, the motor is stopped as discussed above, and an indication of the over-voltage protection state is output using the display and an appropriate indicator including outputting a state code such as "08". Thus, a controller implementing the above described method may permit an operator to easily monitor a state of the lathe as well as providing convenient, intuitive, and safe lathe operation. Additionally, other output designations may be used as the disclosure is not limited in this fashion.

Figure 6:
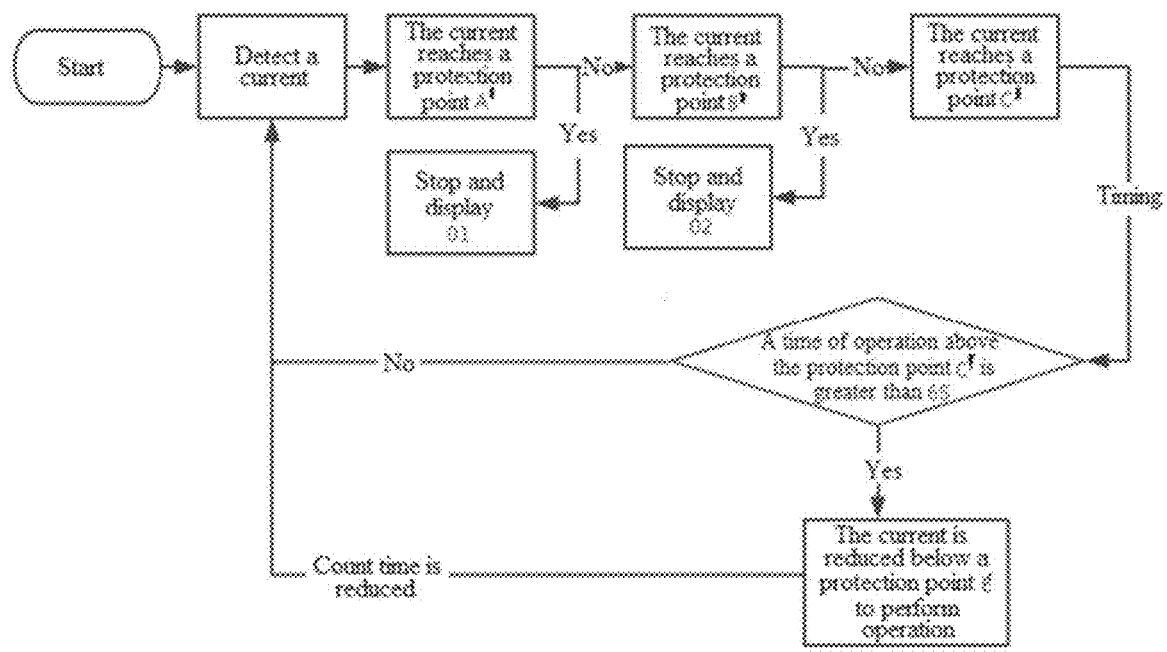
FIG. 6 is a block diagram of a current protection method according to one embodiment.

One embodiment of a current protection method is depicted in FIG. 6. In the depicted embodiment, a controller associated with a lathe motor may implement a hardware protection point and a separate software protection point as described further below due to software protection being relatively slower than hardware protection. Therefore, in such an embodiment even if software protection fails, hardware protection may be added to improve the use and operational safety of a woodworking lathe.

As depicted in FIG. 6, after a lathe motor is started, an associated motor current increases. A current sampling resistor may be used to detect a current value of the motor in real time. Additionally, a filtering module corresponding to one or more of a low and high pass filters may be configured to filter out noise in the signal. In some embodiments, the detected current value may be relatively small. Therefore, in some applications, an operational amplifier and a voltage comparator may be used to perform amplification processing of the detected current signal. The detected current value or signal may then be transmitted to the controller where the detected current is compared with preset thresholds corresponding to one or more current protection points as described further below.

In the depicted current protection method, the detected current is compared to a first upper current threshold corresponding to a hardware protection point A'. If the detected current exceeds the hardware protection point, the controller may be configured to control an IGBT drive circuit, or other control mechanism, to stop the motor operation by turning off and/or reducing power to the motor to protect the system. The controller may then output an indication of the system state using a display, such as a nixie tube, using any appropriate indicator including a state code such as "01". If the detected current is determined to be below the hardware protection point A', the motor operation may continue with the current detector continuing to sample the motor current in real time. When it is detected that the motor current reaches exceeds a second upper current threshold corresponding to a software protection point B', the controller may be configured to stop the motor as described above to again protect the system. The controller may also output an indication of the system state using an indicator such as a state code "02". If the detected motor current is below the software protection point B', the motor may then continue operation. However, due to the use of manual cutter tools, woodworking lathes may oftentimes experience a locked-rotor or drive shaft. At the same time when a rotor is locked, a relatively large current draw from the motor may occur. If the rotor is locked for a long time, the motor and/or the controller may be damaged by the resulting large current. Therefore, after it is detected that the rotor is locked, for example, when the detected current exceeds a third current threshold corresponding to a locked-rotor or shaft protection point C', operation of the motor may be continued for a predetermined period of time (for example, 6 seconds). If the rotor is unlocked, e.g. the detected current falls below the locked-rotor protection point C', the motor may continue operation normally. However, if the rotor stays locked, it may be desirable to reduce the current applied to the motor during continued motor operation. Therefore, the controller may be configured to control an associated IGBT drive circuit, or other appropriate control mechanism, to reduce an IGBT drive signal (a PWM pulse width), to reduce the motor voltage, so as to reduce the applied motor current. Therefore, in such an embodiment, the motor may be operated with an applied current that is below a fourth current threshold corresponding to a rated protection point E' (i.e. a maximum rated working current of the motor), and the motor may continue to be operated normally.

In addition to the above noted protection methods, it may be desirable in some embodiments to implement a stepless speed-regulation function and a constant torque function for the operation of a lathe motor to facilitate convenient use by an operator for cutting different materials and improve ease of operation. Therefore, in such an embodiment, a lathe may include a voltage detection module, such as a potentiometer or any other appropriate voltage detector that is electrically connected to the controller and a current sampling module that is configured to detect the motor current. The current sampling module may correspond to any appropriate detector capable of measuring the motor current, including, for example a current sampling resistor, a current sensor and a current transformer, and/or any other appropriate detector to detect the motor current. A current filtering circuit may also be included between the detector, such as the noted current sampling resistor, and the controller. The current filtering circuit may be configured to filter out noise in the detected current signal. Because the detected current may be relatively small, a voltage comparator and operational amplifier may be included to amplify the current and transmit the amplified current to the controller.

Figure 7:
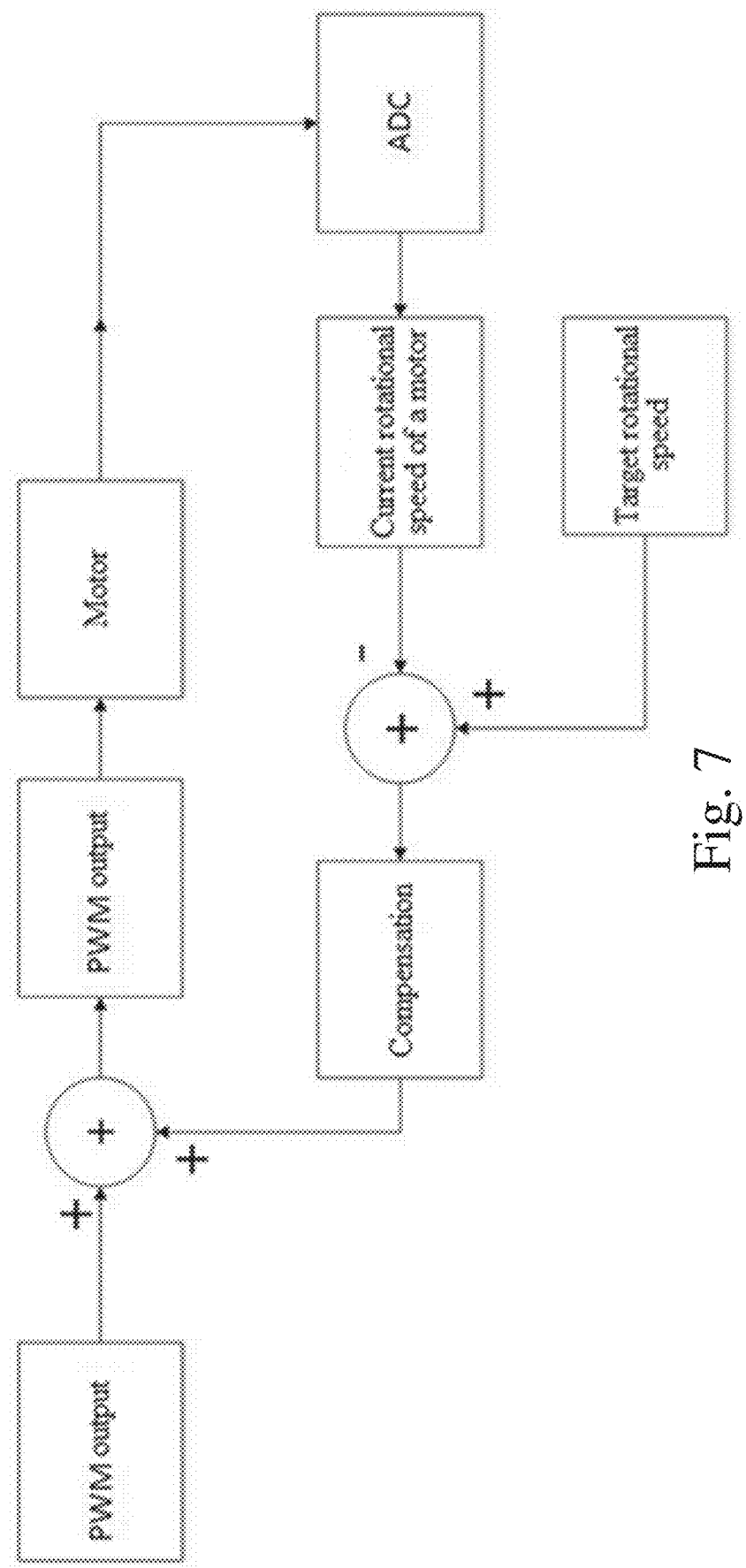
FIG. 7 is a block diagram of a control method for stepless speed regulation and torque regulation of a motor according to one embodiment.

FIG. 7 depicts one embodiment of a control method for controlling a motor for stepless speed regulation and torque regulation of an electric motor. It is noted that a torque and a current of a direct-current motor are directly proportional to one another. Therefore, by using the depicted method a controller of a lathe motor may perform sampling, feedback, and compensation of a motor current to implement a desired stepless speed-regulation and torque-regulation of the motor. Specifically, the controller may include a stepless speed-regulation module and a torque-regulation module that control the motor current in real time, so as control the applied torque. When implementing stepless speed regulation, an initial pulse width modulation output is applied to the motor. A voltage detector, such as a potentiometer, may be used to detect a voltage and the signal may be passed through an analog to digital converter (ADC) that transmits the detected voltage to the controller. This signal may also function as an indirect measure of the current rotational speed of the motor. The detected voltage signal may then be compared to a target rotational speed or voltage of the motor to control and regulate a motor drive signal, such as a pulse width of a pulse width modulation (PWM) signal, to regulate the motor voltage. For example, depending on the detected voltage, the effective voltage applied to the motor may be increased or decreased from the detected value to either increase or decrease the rotational speed respectively. At the same time, such as during low-speed operation of a motor, the controller may also control the motor current, to enable the motor to output a relatively large torque regardless of the motor operating speed. Consequently, the motor operation may be improved relative to a typical asynchronous motor and a frequency converter.

The above described embodiments are generally related to improvements within the field of woodworking lathes, though they may be applied to any type of lathe as well or other power woodworking tools. Additionally, these embodiments, may be used to enable forward and reverse rotation function of a lathe motor, while also helping to mitigate, or effectively prevent, misoperation of the lathe during forward and reverse rotation switching of the motor. Additionally, the embodiments describe possible voltage and current protection methods that may be implemented in a lathe to provide more comprehensive protection. These various embodiments may also be combined with, or used separately from, the described embodiments related to a driver control system and a direct-current motor used to implement a stepless speed-regulation function and constant torque output at a significantly reduced cost as compared to prior control systems that combine a frequency converter and an alternating-current motor. In view of the above, the various embodiments described herein, may provide increased power output as compared to prior systems using a frequency converter and an alternating-current motor, thereby facilitating cutting operations while also improving working efficiency, precision, and operational safety.

The above-described embodiments of control methods and systems may be implemented in any of numerous ways. For example, the embodiments may be implemented using hardware, software or a combination thereof. When implemented in software, the software code can be executed on any suitable controller such as a processor or collection of processors. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Also, a controller may be connected to one or more input and output devices. These devices can be used, among other things, to present a user interface. Examples of output devices that can be used to provide a user interface include liquid crystal displays, nixie tube displays, LED's, display screens, and/or any other appropriate device for visual presentation of the desired output. Examples of input devices that can be used for a user interface include keypads, keyboards, switches, buttons, and pointing devices, such as mice, touch screens or pads, and/or any other appropriate input device.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosed embodiments may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A lathe comprising:
   an electrical motor drivingly coupled to a shaft of the lathe;
   a controller that controls operation of the motor; and
   at least one detector that outputs a signal to the controller, wherein the at least one detector detects an electrical characteristic of at least one of an electrical bus and the electrical motor, wherein the controller controls at least one aspect of the electrical motor's operation based on a comparison of the detected electrical characteristic to a preset threshold, and wherein the electrical characteristic is a motor current, and the preset threshold is at least one of a hardware protection point, a software protection point, or a locked-rotor protection point.

2. The lathe of claim 1, wherein the preset threshold is the locked-rotor protection point, and the controller limits the motor current to a lower second current threshold after the motor current is above the locked-rotor protection point for a predetermined duration.

3. The lathe of claim 1, wherein the controller turns off power to the electrical motor based on the comparison of the detected electrical character to the preset threshold.

4. The lathe of claim 1, wherein the controller comprises a stepless speed-regulation module and a torque-regulation module.

5. A woodworking lathe control system, comprising:
   a microcontroller, a forward and reverse rotation key detection circuit, a motor, and an insulated-gate bipolar transistor (IGBT) drive circuit, the forward and reverse rotation key detection circuit being connected to the microcontroller; and
   further comprising a bus voltage sampling module, a motor voltage sampling module, and a current sampling module, being configured to detect a bus voltage, a motor voltage, and a motor current, respectively, and transmit detected values to the microcontroller, the microcontroller controlling a motor motion by using the IGBT drive circuit, wherein
   the microcontroller further comprises a voltage-protection-point setting module and a current-protection-point setting module, the voltage protection point comprising a bus over-voltage protection point, a bus under-voltage protection point, and a motor voltage protection point, and the current protection point comprising a hardware protection point, a software protection point, and a locked-rotor protection point.

6. The woodworking lathe control system according to claim 5, wherein the forward and reverse rotation key detection circuit comprises a key interface, and a first capacitor C1 and a second resistor R2 that are connected in series to the key interface to form a loop, wherein a connecting terminal of the first capacitor C1 and the second resistor R2 is connected to a high level by using a first resistor R1, the connecting terminal is an I/O terminal, and the other terminal of the first capacitor C1 is grounded.

7. The woodworking lathe control system according to claim 5, wherein the current sampling module is subject to current filtering, and is then connected to the microcontroller through a voltage comparator and an operational amplifier.

8. The woodworking lathe control system according to claim 7, wherein the current sampling module uses a current sampling resistor.

9. The woodworking lathe control system according to claim 5, wherein the microcontroller comprises a stepless speed-regulation and torque-regulation module.

10. The woodworking lathe control system according to claim 5, further comprising a potentiometer detection module connected to the microcontroller.

11. The woodworking lathe control system according to claim 5, further comprising a nixie tube connected to the microcontroller.

* * * * *